(No Model.) 2 Sheets—Sheet 1.
J. D. WRIGHT.
RAPIDLY ADJUSTABLE NUT FOR CALIPERS AND DIVIDERS.
No. 355,430. Patented Jan. 4, 1887.
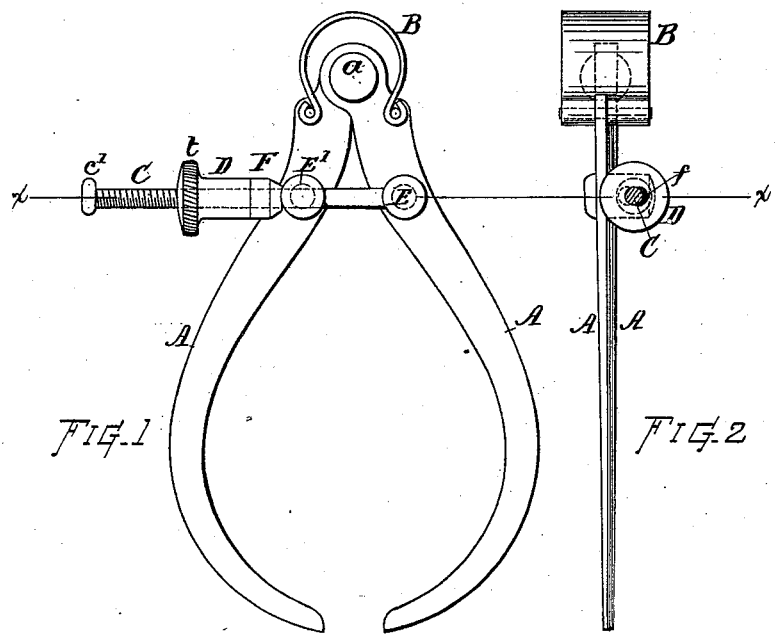
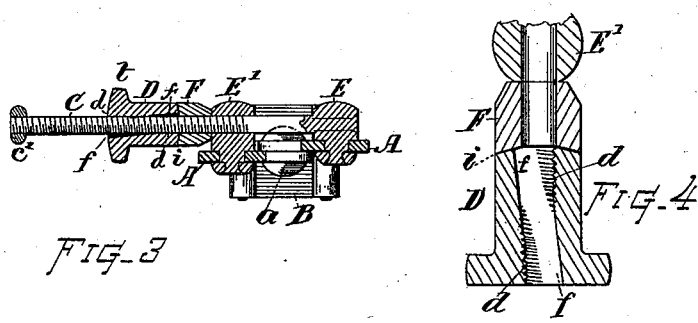
WITNESSES
Ella P. Blenus
D. R. Barton.
INVENTOR
Jacob D. Wright
By Chas. H. Burleigh
Attorney

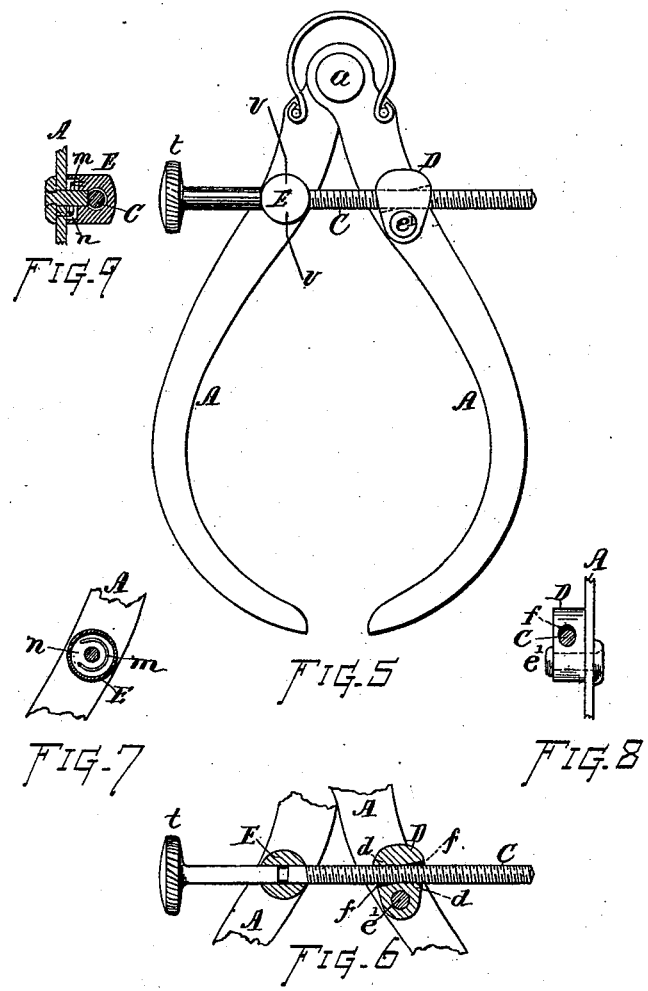

UNITED STATES PATENT OFFICE.

JACOB D. WRIGHT, OF WORCESTER, MASSACHUSETTS, ASSIGNOR TO THE WRIGHT MACHINE COMPANY, OF SAME PLACE.

RAPIDLY-ADJUSTABLE NUT FOR CALIPERS AND DIVIDERS.

SPECIFICATION forming part of Letters Patent No. 355,430, dated January 4, 1887.

Application filed August 25, 1886. Serial No. 211,800. (No model.)

*To all whom it may concern:*

Be it known that I, JACOB D. WRIGHT, a citizen of the United States, residing at Worcester, in the county of Worcester and State of Massachusetts, have invented certain new and useful Improvements in Calipers, Dividers, and Similar Tools, of which the following, together with the accompanying drawings, is a specification sufficiently full, clear, and exact to enable persons skilled in the art to which this invention appertains to make and use the same.

The object of my present invention is to provide a simple and convenient construction for calipers, dividers, and similar tools in which the adjusting-screw and its nut will afford either a screw adjustment or permit of the points being opened or closed by quick action; and my invention consists in the calipers or dividers constructed as herein shown and described, the subject-matter claimed being hereinafter definitely specified.

In the drawings, Figure 1 is a front view of my improved calipers, showing a rotative nut and non-rotative bolt. Fig. 2 is a side view of the same. Fig. 3 is a section at line $x\,x$, looking up toward the head. Fig. 4 is a section through the nut and collar on a larger scale. Fig. 5 shows a modified construction, showing the nut non-rotative and attached to one of the points or legs and the bolt rotative. Fig. 6 is a section through the stud and nut on a plane parallel with the points. Fig. 7 is a section at the base of the screw-supporting stud. Fig. 8 is a side view of the attached nut, and Fig. 9 is a section through the stud at line $v\,v$ in Fig. 5.

Referring to parts, A denotes the points or legs, pivoted together at their top ends by the stud $a$.

B indicates a spring curved about the pivoting-head, with its ends connected to the respective legs A for forcing apart the points in the usual manner.

C indicates the adjustment-screw, and D the nut for engaging said screw and effecting movement of the points to or from each other, as desired.

As shown in Figs. 1 and 3, the end of the screw-bolt C is attached to a stud, E, secured to one of the legs A, and passes through an opening in a stud, E', secured to the other leg. A loose collar, F, is placed on the screw outside the stud, and the nut D is arranged at a position outside the collar, while on the end of the screw is a ball or stop, $c'$, to prevent the nut from running off the screw. The nut is screw-threaded in a bore direct with its axis, and the threads then diagonally relieved or the nut bored out on a diagonal axis, leaving sections of screw-threads at $d\,d$ and spaces $f\,f$ at the opposite side, as shown. The end of the nut adjacent to the collar F is preferably slightly rounded or coned, and the end of the collar cupped or chambered to match, or vice versa, as at $i$. (See Figs. 3 and 4.)

A milled thumb-flange, $t$, is formed on the nut. The studs E E', which are fixed to the legs A in the manner shown, are free to rotate or turn on their axes as the legs open and close, to accommodate the action of the legs and screw.

The collar or end bearing of the nut serves to maintain the screw-threads of nut and bar C normally in position of engagement with each other, and prevent the canting of the nut, except when it is intentionally effected by the operator.

In some instances, if desired, the end of the nut D might be coned or rounded to fit into a correspondingly-shaped countersink formed in the side of the stud E', and the collar F be omitted; but I prefer to employ the collar, as it carries the nut D a little way out from the leg, thus rendering it somewhat more convenient to handle the nut.

The nut D, having the sectional threads and diagonally-bored opening $f$, can be successfully employed in calipers or dividers in which the screw passes through an opening in the leg, instead of through a stud attached to the leg, in which case the face of the collar F, which rests against the leg of the calipers, would be made spherical instead of square, in order that it might properly take bearing as the legs opened or changed their relative position in relation to the position of the screw or bolt C.

In the construction shown in Figs. 5 to 9 the thumb-head $t$ is formed on the screw-bolt C, which bolt in this case is made rotatable in the stud E, and the nut D is made as a swinging block, eccentrically pivoted to the leg A by the stud $e'$, the opening in said nut being fitted with the threaded portions $d\ d$ and spaces $f$, so that the threads can be engaged or disengaged by canting the nut one way or the other.

If desired, a spring, $m$, can be used for swinging the screw-supporting stud E and forcing the end of the screw C in the proper direction for normally maintaining the engagement with the threads of the nut D. Said spring $m$ is shown in Figs. 7 and 9, and consists of a coiled wire inclosed in a cavity, $n$, formed in the base of the stud E, with one of its ends let into a hole in the leg A and the other let into a hole in the stud, the spring being strained in a manner to exert rotative action on the stud in the direction required.

In the operation the points can be adjusted by the action of the screw, or by pressing the points toward each other sufficiently to relieve the pressure on the threads the nut can be canted sufficiently to unlock the threads, and then the nut can be slipped along the bolt freely, allowing the points to be spread or closed quickly, and then the threads be again interlocked and the fine adjustment of the points effected by the rotation of the nut or screw action.

What I claim as of my invention, and desire to secure by Letters Patent, is—

1. The combination, in calipers, dividers, or similar tools, of swinging points or legs A, provided with a spring for forcing them apart, and an adjusting device comprising a screw-threaded bar and a nut screw-threaded, as at $d\ d$, and diagonally bored to give space, as at $f\ f$, to allow said nut to be canted upon the bar, substantially as and for the purpose set forth.

2. The combination, in calipers or dividers, of the swinging legs or points A, pivoted or hinged together at their junction or top, the studs E and E', the screw-threaded bar C, the cantable nut D, having the thread-sections $d\ d$, and counter-spaces $f\ f$, and the collar F, substantially as and for the purpose set forth.

3. The combination, in calipers, dividers, or similar tools having swinging legs or points A, of a screw-threaded bolt or bar connected by a pivotal stud with one of said legs, a nut having a diagonally-relieved thread working in conjunction with said bolt and the opposite leg for effecting and maintaining the adjustment of the points, and means, substantially as described, for normally maintaining the threads of said bolt and nut in position of engagement, as hereinbefore set forth.

4. The combination, in calipers, dividers, and similar tools, of a screw-threaded bar and a diagonally-relievable nut sectionally screw-threaded at $d\ d$, and means, substantially as described, for inducing engagement of the threads of the nut with the thread of the bar, substantially as and for the purpose set forth.

Witness my hand this 18th day of August A. D. 1886.

JACOB D. WRIGHT.

Witnesses:
 CHAS. H. BURLEIGH,
 ELLA P. BLENUS.